United States Patent [19]

Rockola et al.

[11] Patent Number: 5,031,164
[45] Date of Patent: Jul. 9, 1991

[54] COMPACT DISC HOLDING MECHANISM FOR AUTOMATIC COIN OPERATED PHONOGRAM

[75] Inventors: Donald C. Rockola, Chicago; Shuja Haque, Northbrook, both of Ill.

[73] Assignee: Rock-Ola Manufacturing Corporation, Addison, Ill.

[21] Appl. No.: 405,529

[22] Filed: Sep. 7, 1989

[51] Int. Cl.5 .............. G11B 17/22; G11B 23/00; G11B 25/00
[52] U.S. Cl. ...................... 369/37; 369/39; 369/258; 369/263
[58] Field of Search .......... 369/34, 35, 36, 37, 369/38, 39, 258, 263

[56] References Cited

U.S. PATENT DOCUMENTS

| | | | |
|---|---|---|---|
| 2,275,033 | 3/1942 | Mitchell | 369/38 |
| 2,546,845 | 3/1951 | Andres | 369/38 |
| 2,634,984 | 4/1953 | Kasnowich | 369/38 |
| 2,697,607 | 12/1954 | Vanderzee et al. | 369/36 |
| 3,129,005 | 4/1964 | Rockola | 369/37 |
| 3,420,532 | 1/1969 | Osborne et al. | 369/37 |
| 4,740,937 | 4/1988 | Watanabe | 369/271 X |

*Primary Examiner*—Stuart S. Levy
*Assistant Examiner*—Kenneth B. Wells
*Attorney, Agent, or Firm*—McCaleb, Lucas & Brugman

[57] ABSTRACT

An automatically operable compact disc record holding mechanism for accurately depositing and positioning a magnetic holder coaxially over the central record centering hub of a compact disc record turn table such that the magnetic holder is guided into a record holding position along a circular arc and released at a point of tangency with the central vertical axis of the turn table hub while in a substantially horizontal attitude for effecting reliably accurate positioning of the magnetic holder to insure proper holding operation thereof.

5 Claims, 3 Drawing Sheets

COMPACT DISC HOLDING MECHANISM FOR AUTOMATIC COIN OPERATED PHONOGRAM

The present invention relates generally to automatic coin operated phonographs and more particularly to novel mechanism for holding compact disc records in playing position on a turn table.

BACKGROUND OF THE INVENTION

In general automatic phonographs of the coin operated types commonly referred to as "juke boxes", include a record holding magazine moveable through a scanning cycle for the purpose of making selections to be played. The magazine operates in conjunction with a record transfer means which importantly serves to remove the selected records from the magazine and transfer the same to and from a playing position atop a rotatably driven turn table. Typically rotary motion of the magazine has been found to be preferable to provide maximum storage capacity and minimum space.

Magazines and record transfer means of the order above referred to are disclosed in U.S. Pat. Nos. 2,804,307 issued Aug. 27, 1957 and 3,030,116 issued Apr. 17, 1962.

Recent developments in the record art have resulted in the so called compact disc or C.D. record which while generally smaller than a familiar long play record has a greater playing capacity with improved fidelity and lighter weight. Such compact disc records employ laser pick up responsive to reflected light energy thereby eliminating the familiar tone arm and needle pick up and its attendant drive mechanism. With laser pick up, the compact disc record has a vastly prolonged playing life since it is free of needle wear, etc.

In adapting the familiar juke box to C.D. record play several serious problems have been encountered among which is that of maintaining the light weight, relatively small C.D. record in proper playing position on the turn table which is generally rotatable at a relatively high speed in the order of 1600 rpm. Early developments accomplished this by centering the record over a projecting centering hub or cone of the turn table and locking the record in position by means of a light weight magnetic disc holder which over engaged the record adjacent its centering aperture and magnetically clamped the same to the the turn table.

In order to accomplish automatic play of a number of compact disc records as in a juke box, a record storage magazine, record transferring means and a turn table along with means for accurately holding the record in playing position are required, all operable in coordinated relationship. Importantly the record disc must be placed accurately on the turn table and a record holder, such as a magnetic disc, must be positioned and accurately aligned with the centering hub of the turn table to effectively carry out the record holding function. Even slight misalignment of the record holding disc can off balance its contact with the record and turn table to produce improper clamping of the record in playing position. If this occurs, the record can slip or move relative to the turn table, particularly at start up of the latter, to produce inaccurate record play. Furthermore, this clamping operation must be carried out play after play, with accuracy and reliability and without the necessity of frequent adjustment of the record holding mechanism. It is to this record holding problem that the present invention is addressed.

BRIEF SUMMARY OF THE INVENTION

In brief this invention comprises a novel mechanism for accurately and reliably holding a compact disc record on a turn table and which is operable in conjunction with an automatic record transferring mechanism for moving records between a storage magazine and the turn table. Cam means are affixed to the trunnion shaft of the record transfer mechanism for coaxial movement therewith. The cam means actuates lifter means supported on a pivot shaft aligned in a plane coincident with the rotational axis of the transfer mechanism trunnion shaft so as to produce coordinated vertical pivoting movements of a lifter plate in response to rotation of the trunnion shaft. A holder plate is attached to the lifter plate and loosely carries a magnetic disc-like holder for clamping the compact disc record to the turn table. The arrangement of the mechanism is such that the magnetic holder approaches a central centering hub of the turn table along a circular arc and is released to the hub at a point of tangency between such arc and the hub's vertical axis. The upper face plane of the turn table is aligned coincident with the pivot axis of the lifter plate and the rotational axis of the transfer mechanism trunnion shaft. As a consequence of this arrangement and geometrical alignment, the magnetic holder is accurately deposited coaxially over the centering hub of the turn table in a substantially horizontal attitude to insure proper alignment between the turn table's centering hub and the record holder.

The main object of this invention is to provide an improved automatic mechanism for accurately holding a compact disc record on a turn table.

Another important object of this invention is to provide a holding mechanism as set out in the preceding object which is highly reliable in it's operation and which insures positive and accurate coupling of a compact disc record to a turn table.

Still a further object of this invention is to provide a compact disc holding mechanism according to the foregoing objects which is particularly adapted for use in an automatic coin operated phonographs.

Having described this invention the above and further objects, features and advantages thereof will be recognized by those familiar with the art from the following detailed description of a preferred embodiment of it's concepts, illustrated in the accompanying drawings and representing the best mode presently contemplated for enabling those of skill in the art to practice this invention.

IN THE DRAWINGS

DESCRIPTION OF THE PREFERRED EMBODIMENT

Figure 1:
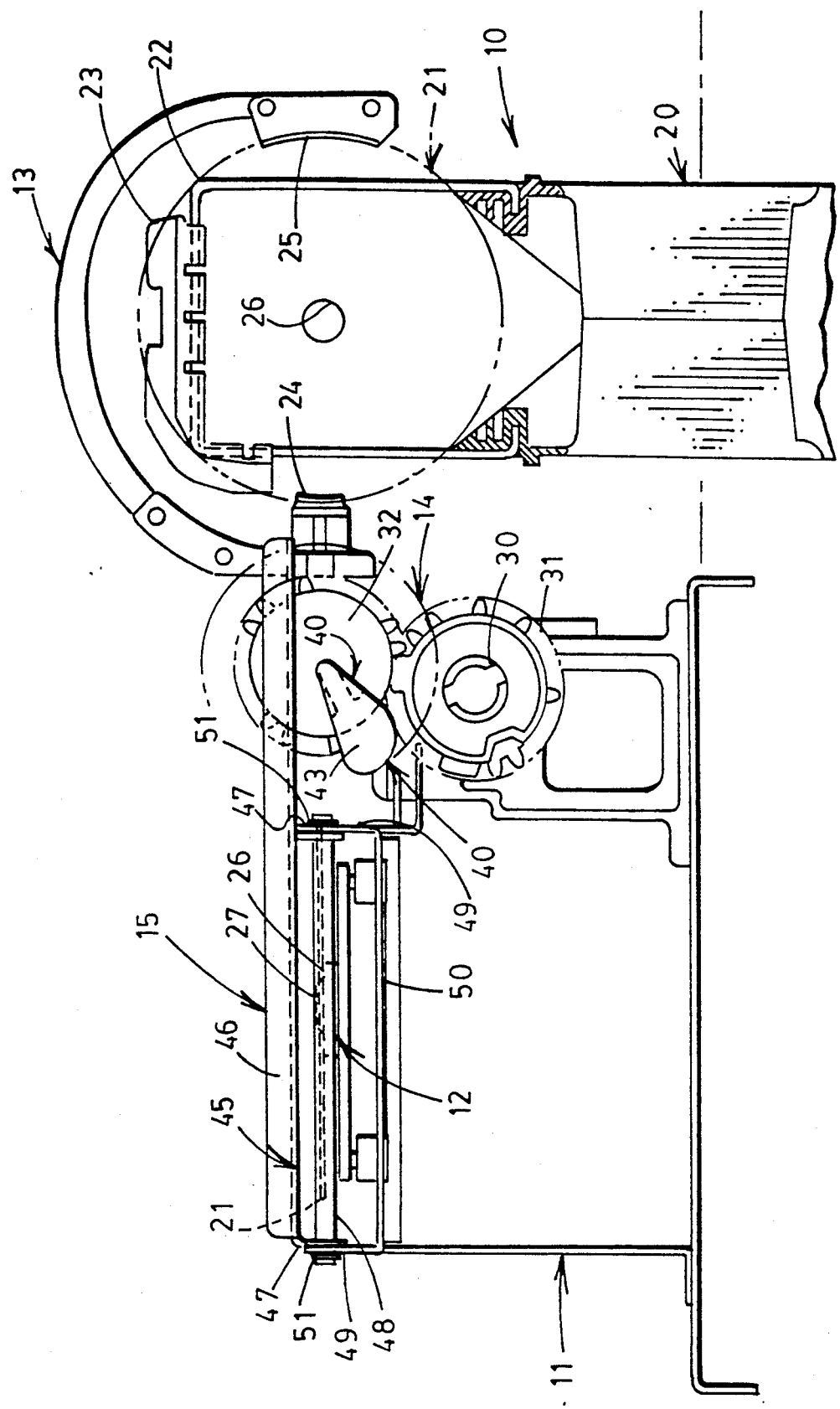
FIG. 1 is a side elevational view of the record holding mechanism of this invention assembled with related compact disc record turn table and record storage magazine.

Referring now to FIG. 1 of the drawings pertinent portions of an automatic phonograph are therein shown as comprising a record holding magazine 10, a turn table drive and player assembly 11 including a drive motor (not shown) for rotatably driving a relatively small diametered turn table 12 at speeds in the order of 1600 rpm for accommodating the playing of compact disc or C.D. records 21 which are transferred to and from the turn table by means of a record transfer mechanism including a gripper arm assembly 13 and drive assembly 14 for actuating the gripper assembly and the improved compact disc record holding mechanism, indicated generally at 15, in accordance with this invention.

Figure 2:
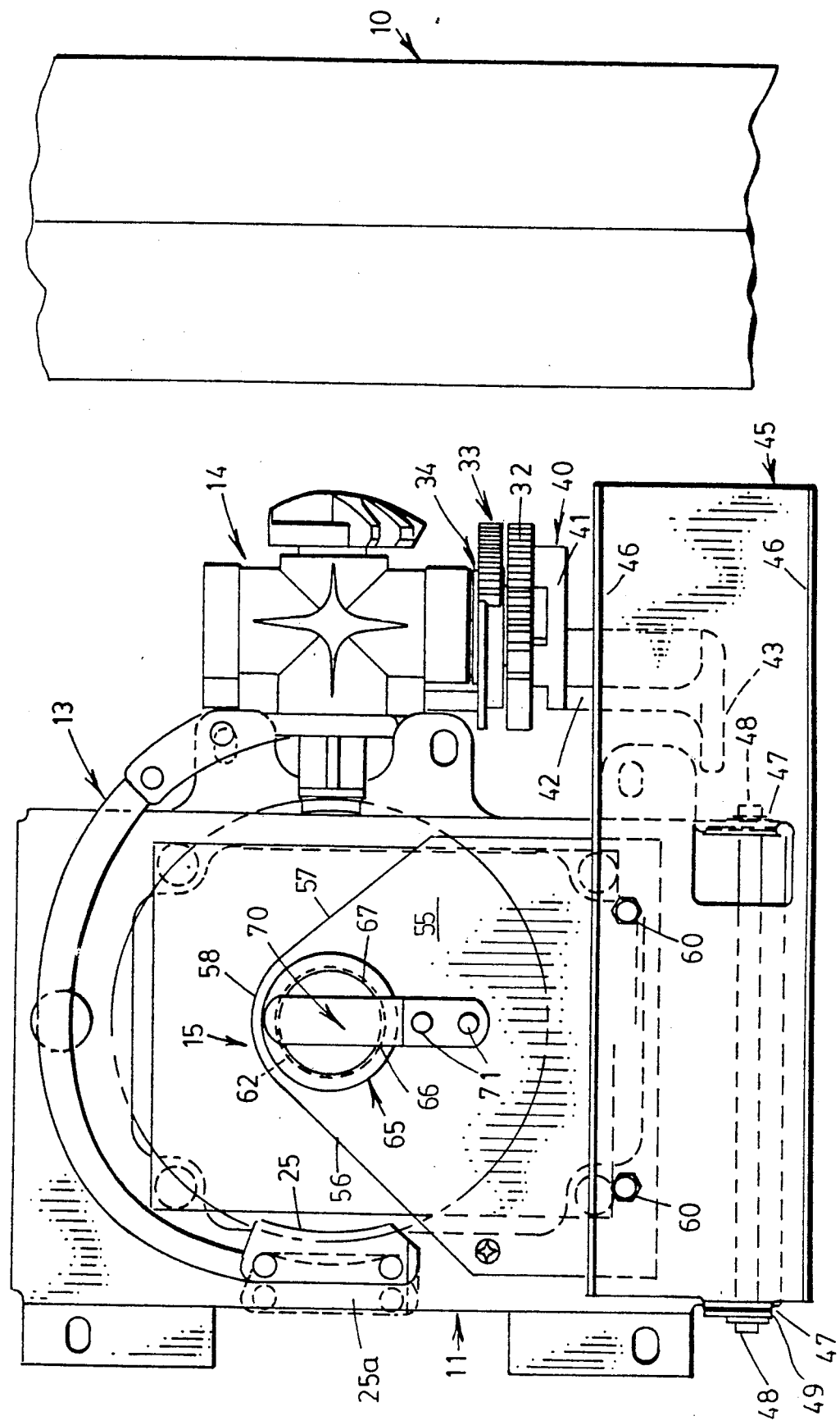
FIG. 2 is a top plan view of the assembly shown in FIG. 1.
Figure 3:
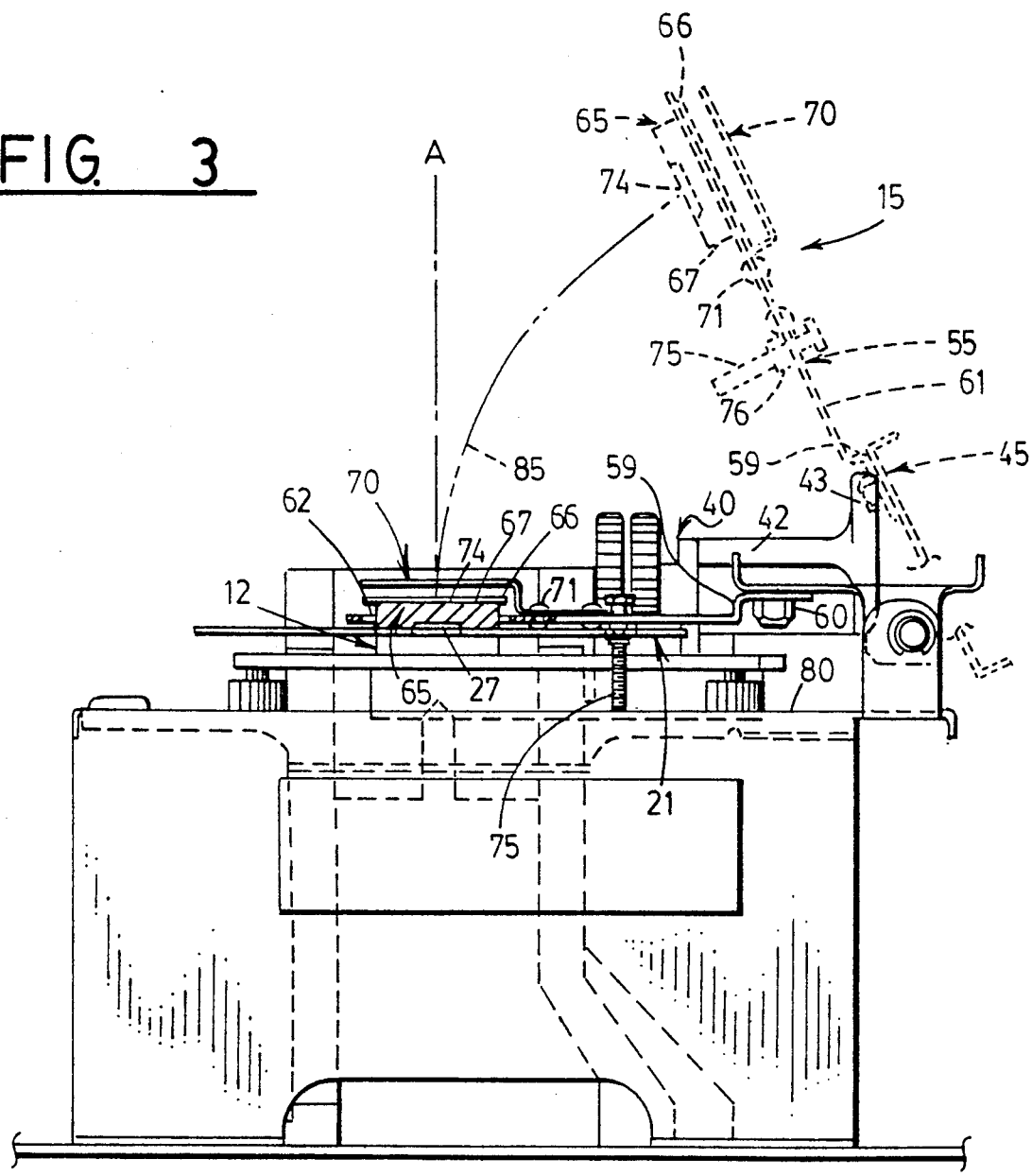
FIG. 3 is an end elevational view thereof, with parts in section, illustrating raised and lowered positions for the record holding mechanism.

An automatic phonograph as partially illustrated in FIGS. 1-3 of the drawings may include parts and assemblies that are the same or similar to those of any of various previous known forms of phonographs such as for example, in U.S. Pat. No. 2,804,307, issued Aug. 27, 1957 to David C. Rockola. Reference may be had to such patent for a description of details in common with the present application although a brief description of certain of the parts common with the teachings of that patent are presented herein for convenience.

In general magazine 10 follows the teachings of the aforesaid U.S. Pat. No. 2,804,307 or that taught in U.S. Pat. No. 3,030,116, issued Apr. 17, 1962. Briefly it will be understand that the magazine assembly 10 is generally toroidal and comprises a central hub 20 mounted on a rotatable shaft (not shown) which is rotatably driven for selectively positioning a predetermined record 21 in an indexed position which, in the present instance, is at or adjacent the top of the magazine so that it may be engaged by the gripper arm assembly 13. The record when selected according to normal sequence of operation is then transferred from the magazine to the turn table 12 for playing and after playing is transferred back to the magazine. The magazine contains a number of records, in this case compact disc records, separated in individual pockets formed by radially extending wire bails 22 having pads 23 attached to upper ends thereof to insulate adjacent records from one another and position the same centrally of the spacing between adjacent bails for engagement by grippers 24 and 25 of the transfer mechanism 13.

Once a selected record 21 is engaged by the grippers of assembly 13, the latter is translated in an arcuate path and turned over to a horizontal position for deposit of the record on the turn table 12 of the player mechanism 11. After play is completed the gripper assembly is again actuated and the record is returned to the magazine. It will be understood, as best viewed in FIG. 2 of the drawings that once the gripper arm assembly 13 has transferred the record 21 to the turn table 12, arm assembly 13 is actuated so that the gripper 25 is clear of the record as indicated by the dotted line position 25a. At the same time the opposing gripper 24 is retracted sufficiently to clear the record thus releasing the latter for rotation with the turn table 12 for playing purposes. The gripper arm assembly 13 meanwhile remains in its horizontal position over the turn table as indicated in FIG. 2 throughout the play of the record whereafter assembly 13 and the grippers 24 and 25 thereof are reactivated to engage the edges of the record and return the same to magazine 10 (indicated schematically in FIG. 2).

The player assembly 11 with its rotatably driven turn table 12 is of known structure which is commercially available, such as model CDM-3 from Philips of Netherlands and does not constitute a part of this invention other than as a context in which the invention is employed. Basically, however, it will be understood that the assembly 11 includes a motorized drive means for rotating the turn table 12 at a speed of approximately 1600 rpm. The turn table 12 as best shown in FIGS. 1 and 3 of the drawings, comprises a relatively small cylindrical member rotatable about a vertical axis a (see FIG. 3) and distinguished on its upper side by a frusto-conical guide hub 27 for receiving a central opening 26 of a record and guiding the same onto the upper planar surface of the turn table 12, as shown in FIG. 1.

The gripper arm mechanism 13 is driven by suitable known drive means 14 which includes an electric motor (not shown) operative through gearing for driving a drive shaft 30 on which is mounted a gear 31. Shaft 30 extends transverse to the horizontal axis a of magazine 10 and to the vertical axis of turn table 12. Gear 31 meshes with an over disposed gear 32, that is part of compound gearing 33 mounted on trunnion shaft 34 of drive means 14 (see FIG. 2). Upon rotation of certain of the elements of the gearing 33 the gripper arm 13 is swung about the axis of gear 32 between its positions for gripping a record in magazine 10 (FIG. 1) and its opposite position in which the record is placed horizontally on the turn table 12 in a known manner. It will be understood that the gears 32 and 33 oscillate for producing the desired swinging movements of the gripper arm assembly 13. For a more detailed explanation of the features of the gripper arm assembly 13 and its drive means 14, reference is made to the aforesaid U.S. Pat. No. 2,804,307.

The foregoing description of the magazine, player assembly, gripper arm and drive mechanism, serves as a background for the mechanism of the present invention constituting the record holding mechanism 15 as will now be set forth in greater particular.

As shown in FIGS. 1-3 of the drawings, the record holding mechanism 15 comprises cam member 40, having a generally cylindrical body 41, affixed to the trunnion shaft 34 of the record transfer drive means 14 for coaxial rotation therewith. As an integral part of body portion 41 an eccentrically disposed and axially outwardly extending arm 42 is provided at the outer end of which is a cam lobe 43 extending transversely of arm 42 and adapted to engage an over disposed lifter plate 45 of generally rectangular configuration in plan as shown in FIG. 2. Rigidifying flanges 46 extend along the elongated margins of plate 45 and project upwardly from the plane of the rectangular body of plate 45. At one end of plate 45 and at a location intermediate the ends thereof are a pair of planar mounting ears 47, 47 struck outwardly of plate 45 and in an opposing direction from the upstanding flanges 46 thereon. The ears 47 are formed with a central opening (unnumbered) receptive of a pivot shaft 48 which passes through the ears 47 and through a cooperating pair of supporting ears 49, 49 struck upwardly at opposite ends of a base member 50 of the player assembly 11 (see FIG. 1). Importantly it will be noted that the longitudinal axis of the pivot shaft 48 is normal or at right angles to the longitudinal axis of the trunnion shaft 34 of the drive assembly 14 on which the cam member 40 is mounted. The pivot shaft axis also passes through the central rotational axis of the cam member 40 as well as through the central axis of the gripper members 24 and 25 associated with the gripper arm assembly 13.

The lifter plate 45 is pivotally actuated in a vertical arcuate direction about shaft 48 in response to rotational activity of the cam member 40 and periodic engagement therewith of lobe portion 43 for reasons which will appear presently. Shaft 48 is locked axially by appropriate C-rings 51, 51 receptive in slotted annular kerfs formed near the outer ends of the shaft 48; the rings 51 being disposed outwardly of the supporting ears 49, 49 associated with base 50 of the player assembly.

Attached to plate 45 adjacent the end thereof opposite that engaged by cam member 42, is a holder carrying plate 55 as best shown in FIGS. 2 and 3 of the drawings. Plate 55 is formed with a pair of angular intersecting edges 56, 57 adjacent its operationally outer end which are interjoined by a curved section 58 formulating the outer end extremity of the plate 55. The opposite end of plate 55 is formed with an offset platform flange 59 (see FIG. 3) which is attached to the underside of the lifter plate 45 as by bolt and lock nut means 60 which pass through adjustment slots (not shown) in flange 59. With this arrangement plate 55 may be longitudinally adjusted relative to plate 45. The holder plate 55 extends at right angles to the longitudinal axis of the lifter plate 45 and pivot shaft 48, with the main body portion 61 thereof in offset parallelism to the plane of the plate 45.

The main body portion 61 of plate 55 is distinguished by an enlarged opening 62 near its outer end (see FIG. 2) which is loosely receptive of a generally cylindrical magnetic holder 65 having a radially outwardly extending flange portion 66 at the upper end of a cylindrical body portion 67 thereof. Radially extending flange portion 66 extends beyond the circumference of the opening 62 in the holder plate to prevent the holder 65 from falling therethrough. A leaf spring 70 is provided, attached at one end, as by rivet means 71, to the upper surface of the holder plate body 61 and is formed with an offset to provide a resilient leaf portion which overhangingly extends across the opening 62 and serves to loosely retain the holder 65 within that opening while permitting removal of the holder 65 if that is desired. It should be noted that the difference in diameter between the opening 62 in the body portion 61 of the holder plate and the diameter of the magnetic holder member 65 is in the order of $\frac{1}{8}"$ or so to permit the holder 65 to move laterally within opening 62 in operation as will appear in greater detail hereinafter.

As best shown in FIG. 3 of the drawings the body portion 67 of the holder 65 (shown in section) is formed with a central frustro conical socket 74 which is adapted to fit over or receive therein the upwardly projecting frustro conical guide hub 27 of the turn table 12. When so interengaged, the holder member 65 is disposed coaxially over the turn table and is guided into such coaxial position by virtue of the frustro conical guide hub formation on the upper side of the turn table and the matching and just slightly larger guide depression or socket 74 on the lower face of the holder member. Importantly the holder member 65 is a permanent magnet which is adapted to magnetically couple with the turn table when placed over the guide hub 27. When the holder member and turn table are so magnetically coupled, a compact disc record 21 mounted on the turn table in the manner illustrated in FIG. 3, will be magnetically clamped to the upper side of the turn table.

For purposes of assuring that the plane of the holder plate 55 is parallel to the upper surface of the turn table, a suitable adjustment bolt means 75 is provided to extend through a lock nut 76 staked to the underside of the plate body 61. The lower end of bolt means 75 engages the upper surface 80 of the mounting platform on which the turn table 12 is supported in the player assembly 11.

Such adjustment bolt extends through the body portion 61 of the holder plate and is suitably headed at its upper outer end for engagement by a socket wrench or the like for threading adjustment through nut member 76. Normally the vertical adjustment of the adjustment bolt 75 is fixed at the factory and is set in the desired position and requires no further adjustment by the user. However, the adjustment means or bolt 75 may be further adjusted as necessary in order to maintain the holder plate 55 parallel to the turn table for proper operation.

From the foregoing description it will be recognized that upon rotational operation of the cam member 40 from its FIG. 1 position to its FIG. 3 position in response to activity of the gripper arm assembly 13 to transfer a record from the magazine 10 to the turn table 12, and more particularly upon rotation of gear means 32 and its trunion axle, lifter plate 45 is raised from its horizontal or lowered position as illustrated in full lines in FIG. 3 of the drawings to its raised position as indicated by dotted lines in that figure. Conversely when the record 21 is deposited on the turn table in the manner illustrated in FIG. 2 of the drawings, the assembly 15 is lowered to its full line horizontal position as indicated in FIG. 3. Thus the magnetic record holder 65 is carried along a circular arc (indicated at 85 in FIG. 3) which arc intersects the vertical central rotational axis a of the turn table a point of tangency with such axis when assembly 15 is its horizontal position. As a consequence of this geometric relationship, it will be noted that the holder 65 is generally horizontal at the time the guide socket in the lower face thereof engages the frustro conical guide of the turn table's centering hub. The formation of the guide socket cooperates with the sloping sides of the turn table guide hub to move the holder 65 laterally or horizontally in the loose fitting opening 62 of the holder plate as required to achieve mating interengagement between the socket of the holder and the upstanding frustro conical guide hub of the turn table. Thus the holder 65 is accurately placed in coaxial relationship with the vertical rotational axis of the turn table to permit positive magnetic gripping action between the holder 65 and the turn table whereby to clamp a compact disc record 21 tightly therebetween for playing purposes. It will be appreciated in this regard that that central axes of the pivot shaft 48, the cam member 40 and the trunion shaft for gear 32 of gripper arm drive assembly 14 all lie in a common plane and that the body portions of the lifter and holder plates 45 and 55 are parallel to such plane. Consequently with the location of the holder means 65 at an appropriate radial distance from the axis of the pivot shaft 48, the arc of movement for the holder is maintained very accurately to intersect the vertical axis a of the turn table in a tangential manner at the point of depositing the holder over the upper end of the turn table guide hub. The frustro conical holder socket 37 and guide cone at the upper end of the turn table hub cooperate to laterally shift the holder if needed to effect close fitting interengagement between the holder and the turn table. Such lateral shifting however occurs at or near the point of deposit of the holder on the turn table and is generally in a direction paralleling the upper face of the turn table, i.e., horizontal. Such horizontal movement of the holder 65 upon engagement with the turn table is extremely limited by the periphery of the surrounding opening 62 in the holder plate, and the frustro conical guide of the turn table hub. It will be understood, of course, that once the holder 65 is located on the turn table as above noted, the magnetic interengagement between the holder and the turn table occurs to tightly clamp the compact disc record in place and that as the record is rotated upon activation of the turn table, the holder 65 rotates within opening 62 of the holder plate inasmuch as the holder rotates with the record and turn table 12.

From the foregoing it is believed that the novel advancement of the present invention will be appreciated by those skilled in the art. While the invention has been herein described in association with a particular preferred embodiment, illustrated in the drawings, it is to be recognized that the same is subject to modification and changes without departing from the spirit and concepts of the invention which is intended to be unlimited by the foregoing except as may appear in the following appended claims.

The embodiments of the invention in which an exclusive property or privilege is claimed are defined as follows:

1. In an automatic coin operated phonograph having a magazine for storing compact disc records and operable for positioning a selected record in indexed position for transfer to and from the magazine, a horizontal rotatable turn table having a record centering hub thereon, and a gripper arm assembly mounted on a horizontally rotatable trunnion shaft operable for transferring selected records between the magazine and the turn table or vice versa, the combination comprising:

cam means attached to said trunnion shaft for coaxial rotation therewith, record holder carrying means mounted for arcuate pivotal movement about a horizontal axis aligned in normal intersecting relation with the trunnion shaft's rotational axis; a magnetic record holder being held by said carrying means to move therewith along a vertical circular arc which tangentially intersects the vertical rotational axis of the turn table at said centering hub thereof; and a lobe on said cam means periodically engageable with said holder carrying means for actuating the same in non-interferring coordination with the movements of the gripper arm assembly and a record carried thereby as the latter is transferred onto and off of the turn table whereby said holder carrying means operates to deposit said record holder coaxially over said centering hub after a record is mounted thereon to clamp said record to said hub during play thereof and to remove said holder from said hub prior to the removal of said record from said turntable by said gripper arm assembly.

2. In an automatic coin operation phonograph having a magazine for storing compact disc records including means for positioning selected records in indexed position in the magazine, a horizontal rotatable turn table having a record centering hub, and a gripper arm assembly mounted on a horizontally rotatable shaft and operable for transferring said selected records between the magazine and the turn table, the combination comprising:

a record holder operable to magnetically clamp a record in playing position on the turn table, for the purpose of holding said record in said position during play, lifter means mounted for pivotal movement about a horizontal axis normal to and coplanar with the rotational axis of said shaft, cam means coaxially rotatable with said shaft and having a lobe engageable with said lifter means for periodically vertically raising and lowering the latter about its said horizontal axis in predetermined non-interferring relation with the record transfer movements of said gripper arm assembly; and means connected to and moveable with said lifter means for carrying said record holder to and from the centering hub of the turn table comprising:

a member extending from said lifter means for movement therewith through a vertical circular arc, and mounting means on said member for coupling said holder thereto for movement along a vertical arc tangentially intersecting the vertical axis of rotation for the turn table at its centering hub whereby to deposit said holder in a substantially horizontal attitude concentrically over said hub so that the latter may magnetically engage and clamp a record to said turn table.

3. The combination of claim 2, wherein the holder has a cylindrical body loosely fitted into an opening formed in said member, spring means for loosely holding said holder in said opening, and guide means formed in the bottom face of said body engageable with mating guide means on the upper end of said centering hub for coaxially aligning said holder and hub.

4. The combination of claim 2, and adjustable stop means for arresting said lifter means and holder carrying means in a horizontal position parallel to the plane of the turn table.

5. The combination of claim 2, wherein said member is adjustably attached to said lifter means whereby said member is positionable for the purpose of establishing the said vertical arc of movement for said holder to insure its tangential intersection with the vertical axis of rotation of the turn table at said centering hub.

* * * * *

UNITED STATES PATENT AND TRADEMARK OFFICE
CERTIFICATE OF CORRECTION

PATENT NO. : 5,031,164

DATED : July 9, 1991

INVENTOR(S) : Donald C. Rockola and Shuja Haque

It is certified that error appears in the above-identified patent and that said Letters Patent is hereby corrected as shown below:

On the title page and column 1, lines 1 & 2 delete "PHONOGRAM" and insert "PHONOGRAPH";

Col. 1, line 21, delete "minimum" and insert -- minimize --;

Col. 1, line 59, delete "its" and insert -- it's --;

Col. 4, line 5, delete "a" (2nd occurence) and insert --A--;

Col. 6, line 17, after "axle" insert -- 34 --;

Col. 6, line 26, delete "a" and insert -- A --;

Col. 6, line 45, delete second "that" and insert -- the --;

Col. 6, line 46, after "of" insert -- the --;

Col. 6, line 53, delete "a" and insert -- A --;

Col. 6, line 56, delete "37" and insert -- 74 --.

Signed and Sealed this

Nineteenth Day of January, 1993

*Attest:*

DOUGLAS B. COMER

*Attesting Officer*     *Acting Commissioner of Patents and Trademarks*